(12) United States Patent
Rowland

(10) Patent No.: US 9,512,667 B2
(45) Date of Patent: Dec. 6, 2016

(54) SLIDING INSPECTION WINDOW FOR HIGH VOLTAGE SWITCHGEAR CABINETS

(75) Inventor: Lewis Rowland, Lancashire (GB)

(73) Assignee: LMR TECHNOLOGIES LIMITED, Lancashire (GB)

( * ) Notice: Subject to any disclaimer, the term of this patent is extended or adjusted under 35 U.S.C. 154(b) by 0 days.

(21) Appl. No.: 13/884,950

(22) PCT Filed: Nov. 14, 2011

(86) PCT No.: PCT/GB2011/052216
§ 371 (c)(1),
(2), (4) Date: Jun. 11, 2013

(87) PCT Pub. No.: WO2012/066316
PCT Pub. Date: May 24, 2012

(65) Prior Publication Data
US 2013/0249364 A1    Sep. 26, 2013

(30) Foreign Application Priority Data
Nov. 15, 2010 (GB) .................................. 1019205.2

(51) Int. Cl.
*H01H 9/02* (2006.01)
*E06B 5/10* (2006.01)
(Continued)

(52) U.S. Cl.
CPC ................. *E06B 5/10* (2013.01); *A47B 81/00* (2013.01); *E06B 7/30* (2013.01); *G21F 7/03* (2013.01);
(Continued)

(58) Field of Classification Search
CPC .. E05B 17/2003; E05B 1/115; E05B 65/0811; E06B 2009/804; E06B 9/115; E06B 5/10; E06B 7/30; H01B 1/306; H01B 11/26; H01H 2009/0292; H05K 7/1418; A47B 77/02; A47B 77/04; A47B 77/10; A47B 77/16; A47B 81/00; A47B 88/20; A47B 88/044; A47B 88/047; A47B 88/0477; A47B 2210/0059; A47B 2210/0064; A47B 2210/0067; A47B 2210/007; G21F 7/00; G21F 7/02; G21F 7/03; G21F 7/005; H01P 1/08; B01L 1/50
(Continued)

(56) References Cited

U.S. PATENT DOCUMENTS 3,114,945 A  * 12/1963 Bonnet et al. ............... 52/171.1
3,991,348 A    11/1976 Evans
(Continued)

FOREIGN PATENT DOCUMENTS

CN    201001012 Y    1/2008
EP    0866204 A1     9/1998
(Continued)

OTHER PUBLICATIONS

Patent Cooperation Treaty, Notification of Transmittal of the International Search Report and the Written Opinion of the International Searching Authority for PCT/GB2011/052216 dated Mar. 8, 2012, 9 pages.
(Continued)

*Primary Examiner* — Brian Mattei
*Assistant Examiner* — Ryan A Doyle
(74) *Attorney, Agent, or Firm* — Hoffman Warnick LLC

(57) ABSTRACT

Disclosed is a device for facilitating inspection of the interior of a cabinet, while preventing direct physical access thereto, the device comprising: a movable shutter element, arranged to move from a closed to an open position upon insertion of a slide element, such that insertion of the slide element causes the shutter element to move in correspon-
(Continued)

dence to the slide element so that the interior of the cabinet is physically shielded from the exterior.

20 Claims, 11 Drawing Sheets

(51) Int. Cl.
  *E06B 7/30* (2006.01)
  *G21F 7/03* (2006.01)
  *H02B 1/30* (2006.01)
  *A47B 81/00* (2006.01)

(52) U.S. Cl.
  CPC ...... *H02B 1/306* (2013.01); *H01H 2009/0292* (2013.01)

(58) Field of Classification Search
  USPC ............. 312/223.1, 319.1, 292, 349, 350, 1; 52/171.1; 49/70, 171
  See application file for complete search history.

(56) References Cited

U.S. PATENT DOCUMENTS

| | | | | |
|---|---|---|---|---|
| 4,729,614 | A | * | 3/1988 | Nadler et al. ................. 312/292 |
| 4,763,444 | A | * | 8/1988 | Ritchie ............................ 49/171 |
| 6,561,373 | B1 | * | 5/2003 | Chapin ........................ 220/262 |
| 8,407,938 | B2 | * | 4/2013 | Faria ............................... 49/149 |
| 2002/0071261 | A1 | | 6/2002 | Wilcox |
| 2007/0075073 | A1 | * | 4/2007 | Chen et al. ................... 219/740 |

FOREIGN PATENT DOCUMENTS

| | | |
|---|---|---|
| GB | 2301229 A | 11/1996 |
| JP | 2003188556 A | 7/2003 |

OTHER PUBLICATIONS

Patent Cooperation Treaty, Notification of Transmittal of the International Preliminary Report on Patentability and the Written Opinion of the International Searching Authority for PCT/GB2011/052216 mailed May 30, 2013, 5 pages.

* cited by examiner

SLIDING INSPECTION WINDOW FOR HIGH VOLTAGE SWITCHGEAR CABINETS

The present invention relates to the inspection of electrical switchgear equipment, particularly high voltage (HV) electrical switch gear equipment, although embodiments of the invention may be used with switchgear equipment operating at any voltage including Medium Voltage (MV) systems.

Electrical switchgear equipment is often housed in heavy duty electrical cabinets having a hinged door or doors located on an exposed surface of the cabinet. Opening the door or doors can expose a user to potentially lethal voltages and so access to such cabinets is very strictly controlled and is normally restricted to suitably qualified and trained operatives only. The cabinets themselves are usually locked to prevent casual access.

However, a problem with providing access to such cabinets is that in order to ensure the correct operation of the electrical switch gear, occasionally the cabinet must be opened and inspected whilst the switch gear inside the cabinet is live and potentially dangerous. In fact, regulations for such equipment stipulate that an operator must never be exposed directly to the equipment whilst it is operational. The equipment must also retain its Ingress Protection (IP) rating, which has a minimum value of 65.

There are a number of different tests and inspection processes which can be performed on the switch gear and it is an aim of the embodiments of the present invention to render these as safe as possible.

According to the present invention there is provided an apparatus as set forth in the appended claims. Other features of the invention will be apparent from the dependent claims, and the description which follows.

For a better understanding of the invention, and to show how embodiments of the same may be carried into effect, reference will now be made, by way of example, to the accompanying diagrammatic drawings in which.

Figure 1:
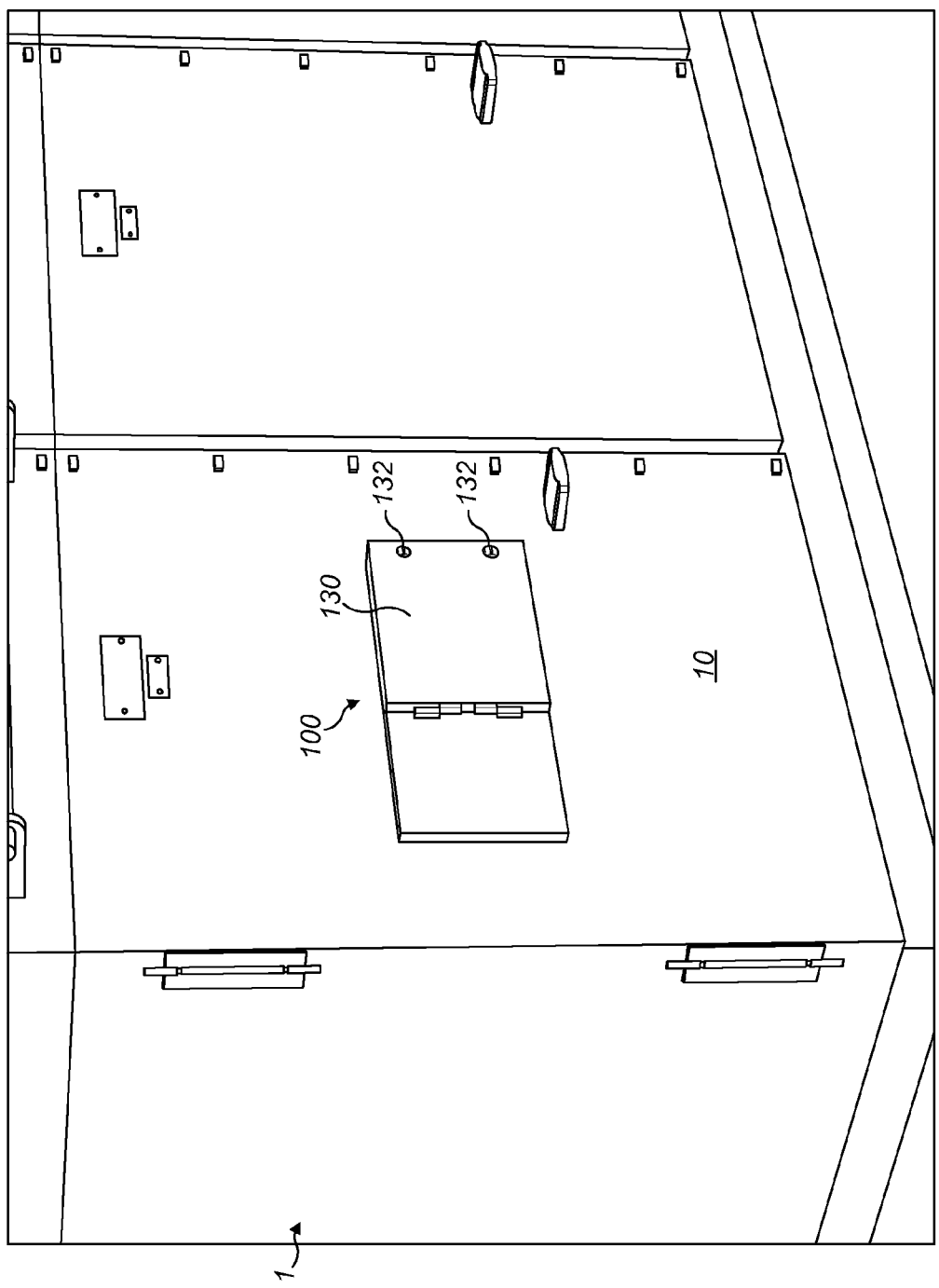
FIG. 1 shows a view of an electrical switchgear cabinet to which has been fitted a device according to an embodiment of the present invention.

FIG. 1 shows a view of an electrical switch gear cabinet 1 to which is fitted a device according to an embodiment of the present invention 100. The device 100 comprises a fixing plate 110 which is securely attached to a door 10 of the cabinet. The manner of attachment of the apparatus 100 will be described later. The fixing plate 110 includes an inspection aperture which is concealed behind hinged door 130, and also behind safety shutter 120.

In order to access the inspection aperture, the door 130 is opened. The door 130 is secured by one or more locks or screws 132. These prevent casual access to the device.

Once the door 130 has been opened a suitably authorised technician, the safety shutter 120 is revealed to the technician. The safety shutter 120 is provided so that, even with the door 130 open, the technician is not exposed to any live switch gear at any time.

The safety shutter 120 which is biased towards a closed position, and which ensures that the inspection aperture is obscured and no access to the live switchgear is possible from the exterior of the cabinet.

The device 100 is formed from steel, and is fixed to the exterior of the cabinet 1 using heavy duty fixings, such as nuts and bolts. Preferably, security bolts are used so that once fitted, the device cannot be easily removed, particularly from the exterior of the cabinet. To fit the device, a suitable aperture is created in the door of the cabinet to coincide with the position of the inspection aperture, and the device 100 is fitted around this aperture.

Figure 2:
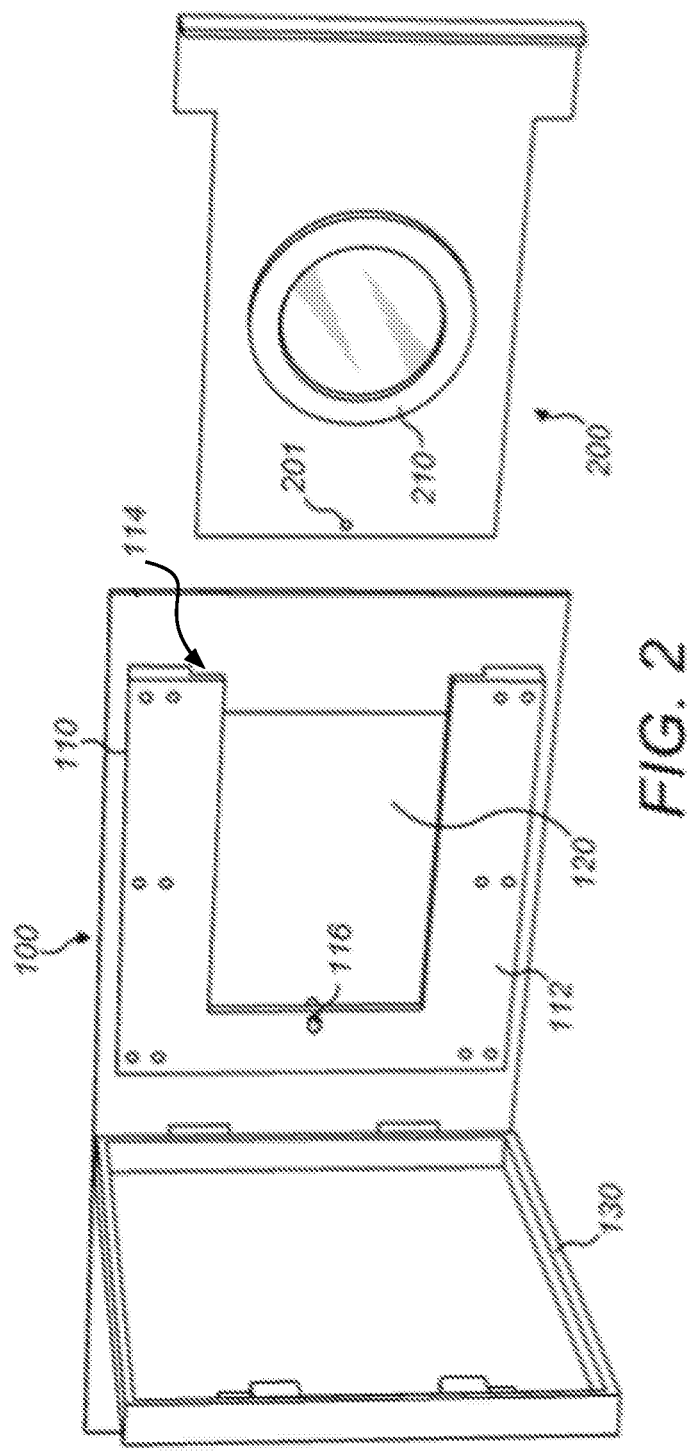
FIG. 2 shows a detailed view of the device shown in FIG. 1 in a first configuration.

FIG. 2 shows the apparatus 100 in the situation where the door 130 has been opened revealing the shutter 120 which obscures the interior of cabinet. Surrounding the aperture closed by the shutter 120, on three sides, is a frame 112, which is provided with slots or grooves 114 proximal the fixing plate 110. In order to inspect the interior of the cabinet, it is necessary to insert one of a variety of different slide elements 200 into grooves 114.

Figure 3A:
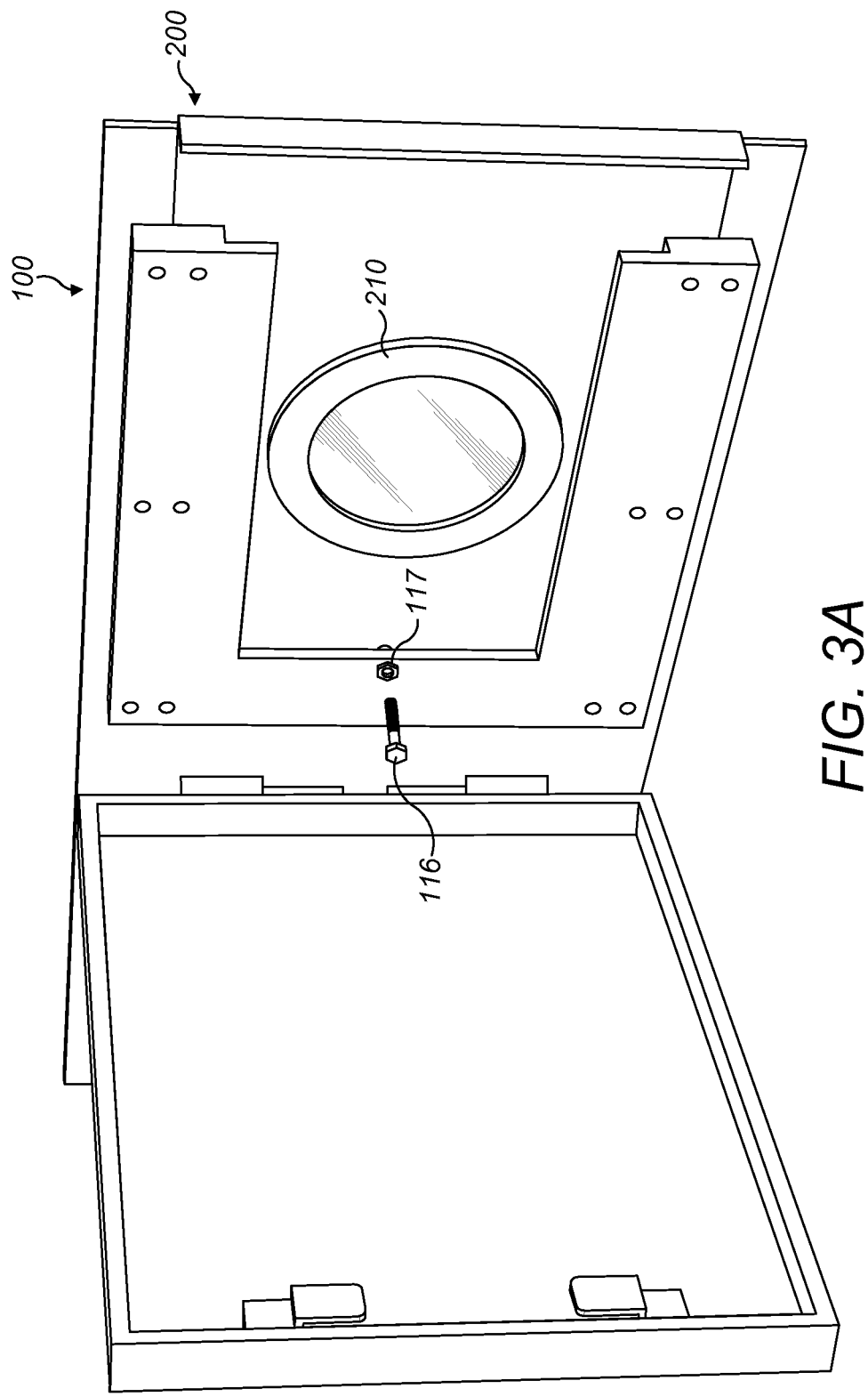
FIGS. 3A and 3B show detailed views of the device shown in FIG. 1 in a second configuration.
Figure 3B:
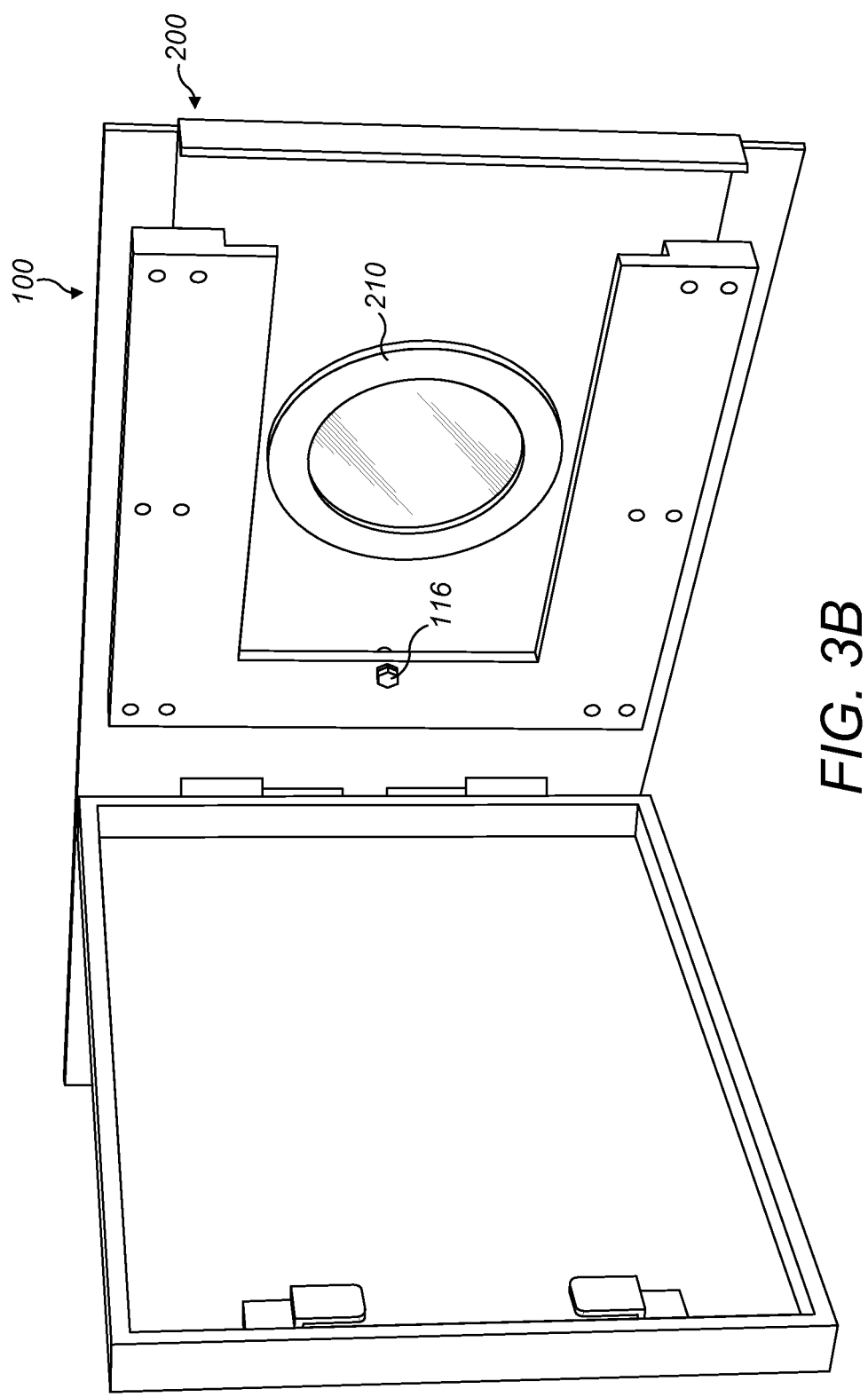

FIGS. 3A and 3B show a view with slide element 200 fully inserted into the device 100, thereby allowing for thermographic inspection of the interior of the cabinet through thermographic window 210. Thermographic inspection involves the non-destructive testing of parts or component within the cabinet by imaging thermal patterns at the surface of said parts or components. The thermographic window comprises a crystal material which permits infra-red wavelength to pass through and be measured at the exterior of the cabinet by suitable equipment such as a thermal imaging camera. A suitable material for the crystal window is Germanium DLC (diamond like carbon). Such inspection can locate hot spots within the cabinet, which can indicate too high a resistance or current and may indicate where a fault is imminent. By shielding the user from direct access to the interior of the cabinet, he is protected, should a fault occur during the inspection process.

Figure 4:
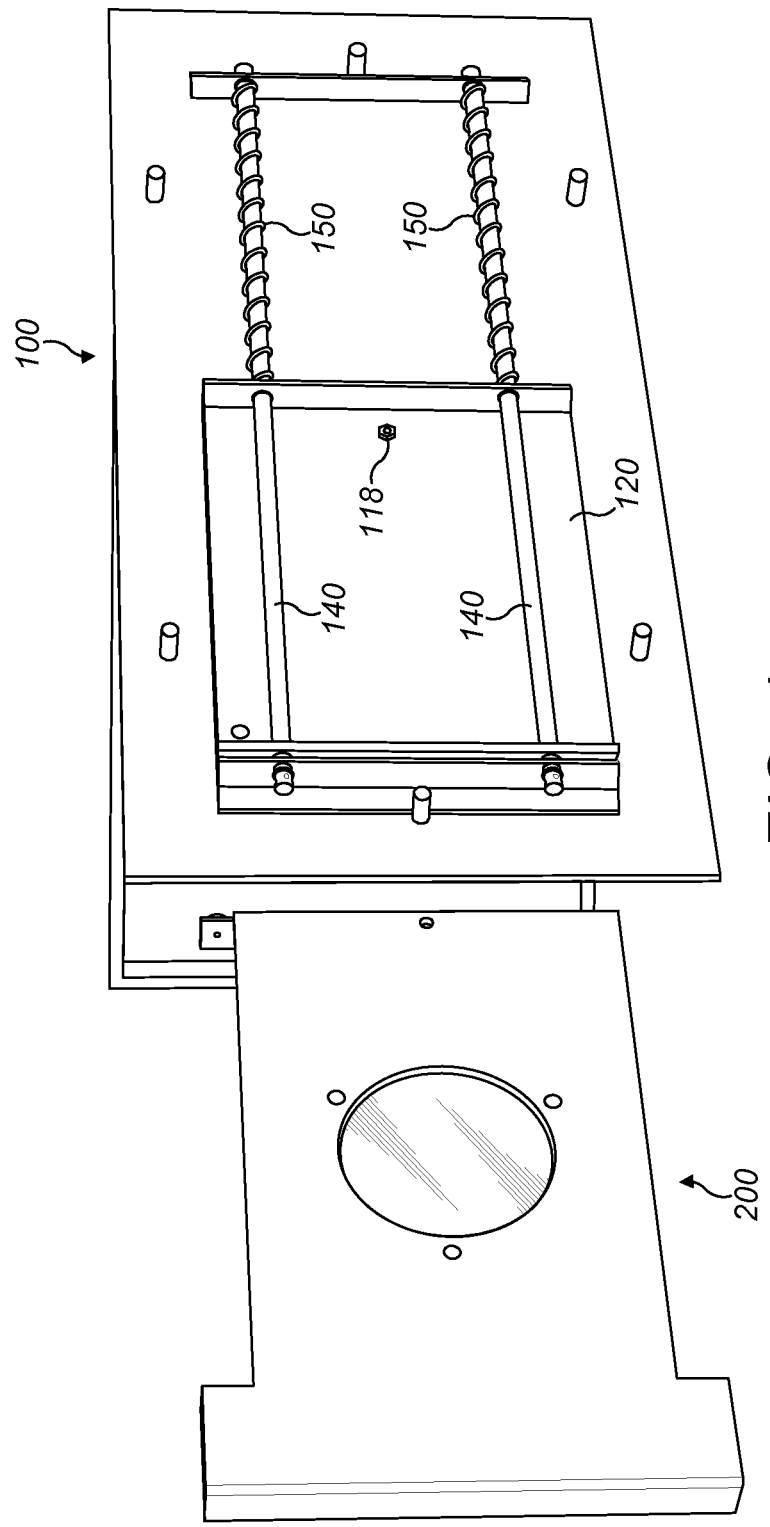
FIG. 4 shows a rear view of the device shown in FIG. 1, in the first configuration.
Figure 5:
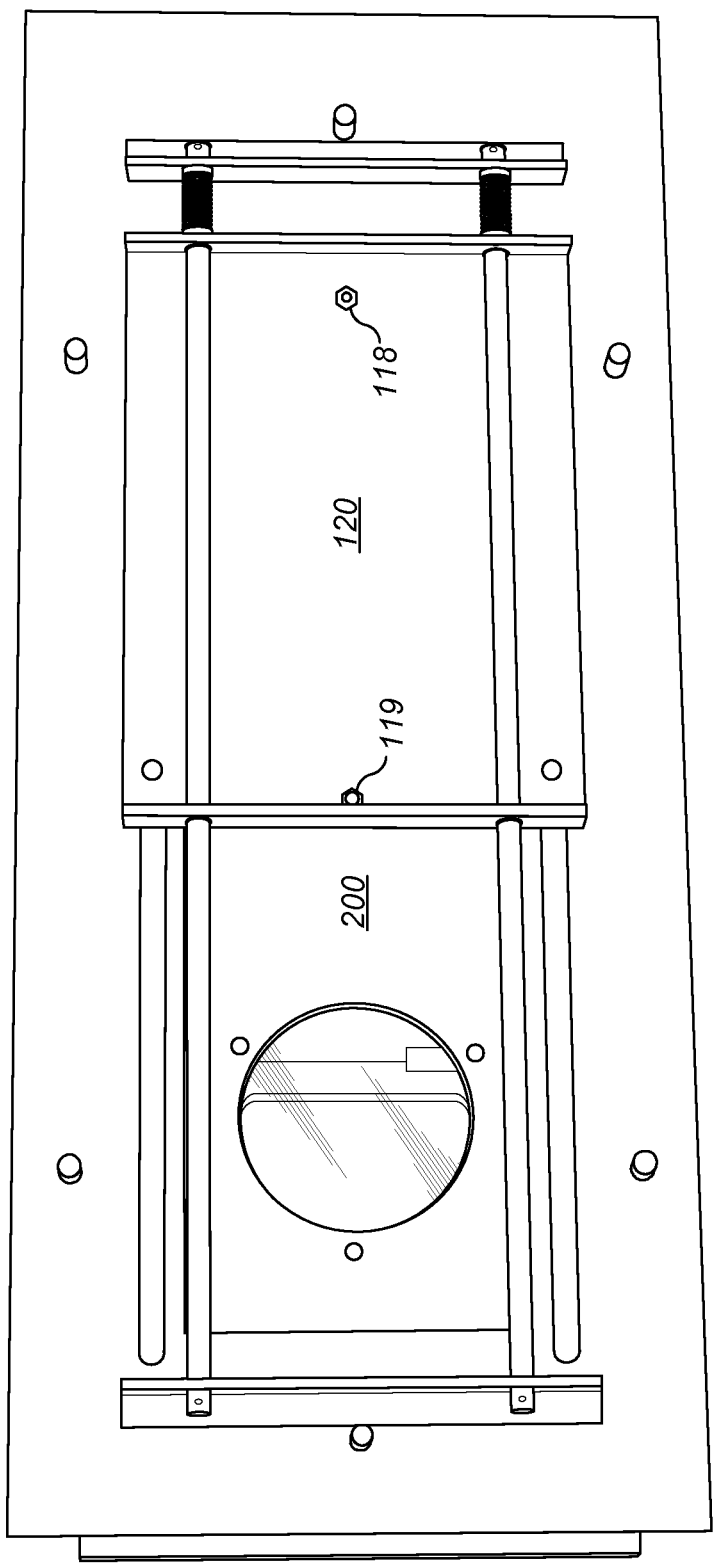
FIG. 5 shows a rear view of the device shown in FIG. 1, in the second configuration.

FIGS. 4 and 5 show rear views of the apparatus 100 corresponding to FIGS. 2 and 3B respectively. Figures In FIG. 4, the shutter 120 can be seen obscuring the access to the interior of the cabinet. Slide 200 is about to be inserted into grooves 114 formed in frame 112. Shutter element 120 is configured to slide, between an open and a closed position, along a pair of elongate members or rods 140. It is caused to slide by means of the insertion force provided by the user as slide element 200 is inserted.

In the closed position, access to the interior of the cabinet is not possible. The open position can only be assumed by the insertion of a suitable slide member 200 which overcomes the bias of springs 150 and causes the shutter element 120 to move to the open position. This can be seen more clearly in FIG. 5 where the shutter element 120 now occupies the open position and slide 200 occupies what would otherwise be the open space previously occupied by the shutter element 120.

As can be seen, the operator is at all times, physically shielded from the interior of the cabinet, but by use of a slide element 200, or one of a range of different slide elements to be described shortly, suitable access can be provided to the interior of the cabinet 1.

The shutter 120 comprises a projection from its surface. The projection protrudes into the channel 114 and is not generally visible from the outside of the cabinet. When a slide 200 is inserted into the channel 114, the leading edge of the slide 200 contacts the projection and continued force on the slide, causes the shutter 120 to move in unison with the slide.

Once the slide element 200 is fully inserted, it is locked in position. This is achieved by means of fixing means 116. Fixing means 116 is preferably a screw or bolt which passes through a hole 117 in frame 110. Fixing means 116 is preferably held captive so that it cannot be removed from the hole 117. The hole continues to the rear surface of the device 100 and aligns with a corresponding hole 201 in slide 200. Once the various holes are in alignment, the screw 116 is inserted fully, which locks the slide in position. To further improve the safety and security of this arrangement, one or more of the holes may be provided with captive bolts so that the nut or screw 116 is actively engaged with the bolts. As shown in the Figures, holes 117 and 119 are provided with captive bolts which are used to lock the slide in position with the shutter open.

In order to remove the slide 200, the lock mechanism 116 is released and as the slide 200 is removed, the bias provided by springs 150 causes the shutter element 120 to return to the closed position, thereby ensuring that the operator is screened from the interior of the cabinet throughout the slide-removal process. The shutter 120 is provided with a further hole and bolt 118, into which the nut 116 is fastened so as to lock the shutter in the closed position, although this is optional. In use, the shutter element 120 is concealed behind a lockable door 130, and this provides adequate security.

Figure 6:
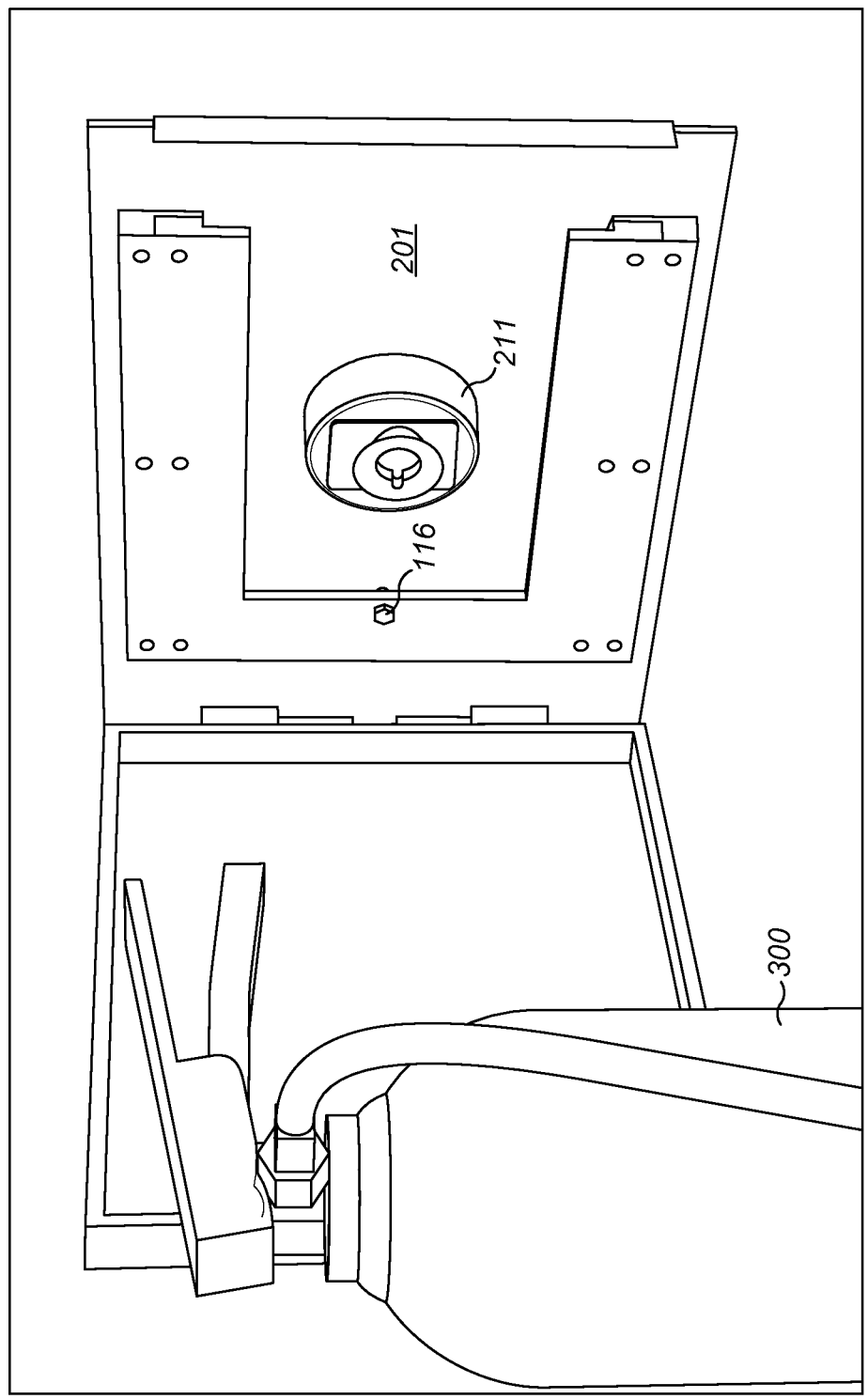
FIGS. 6-8 shows various views of a variant of the device according to an embodiment of the present invention.
Figure 7:
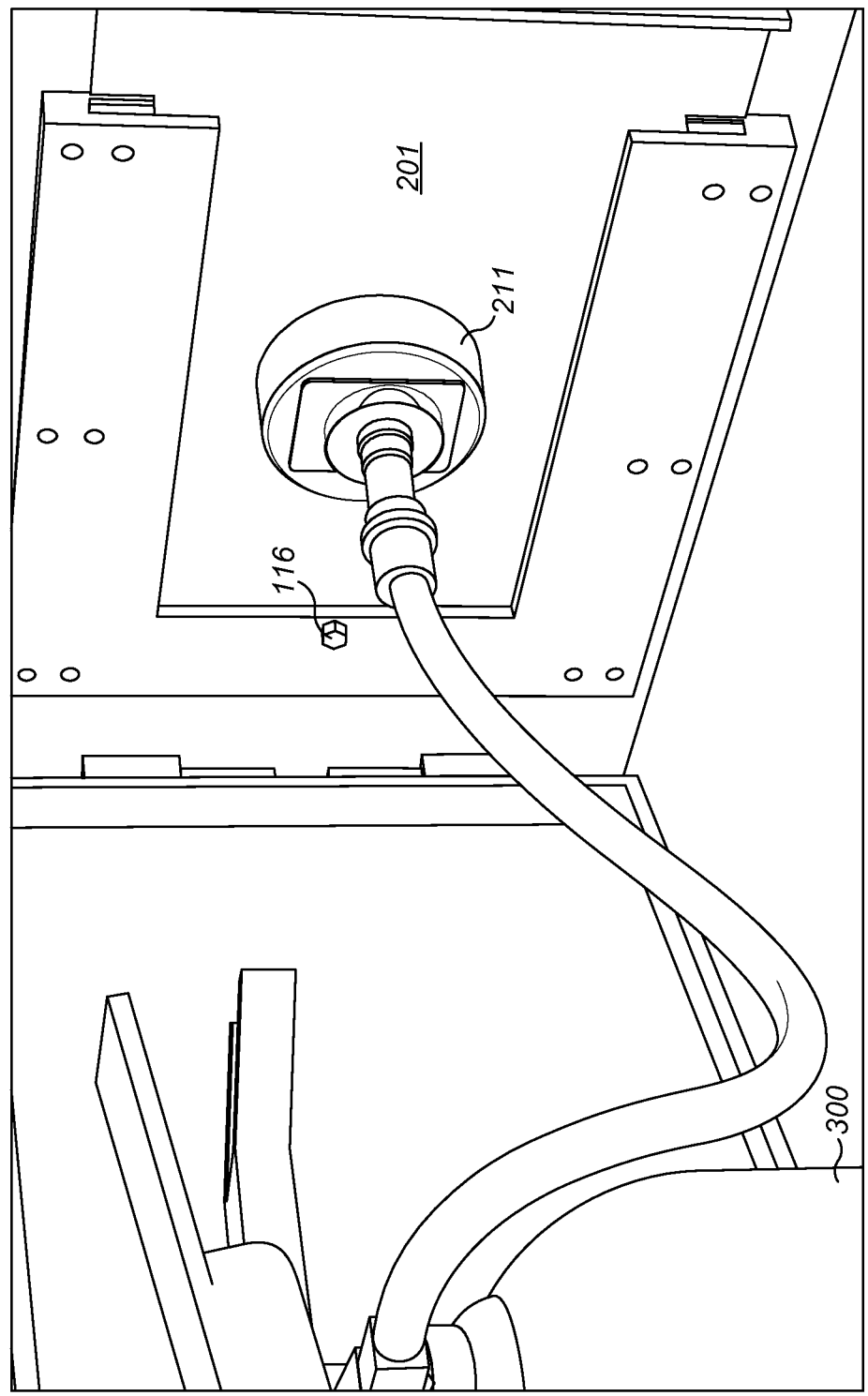
Figure 8:
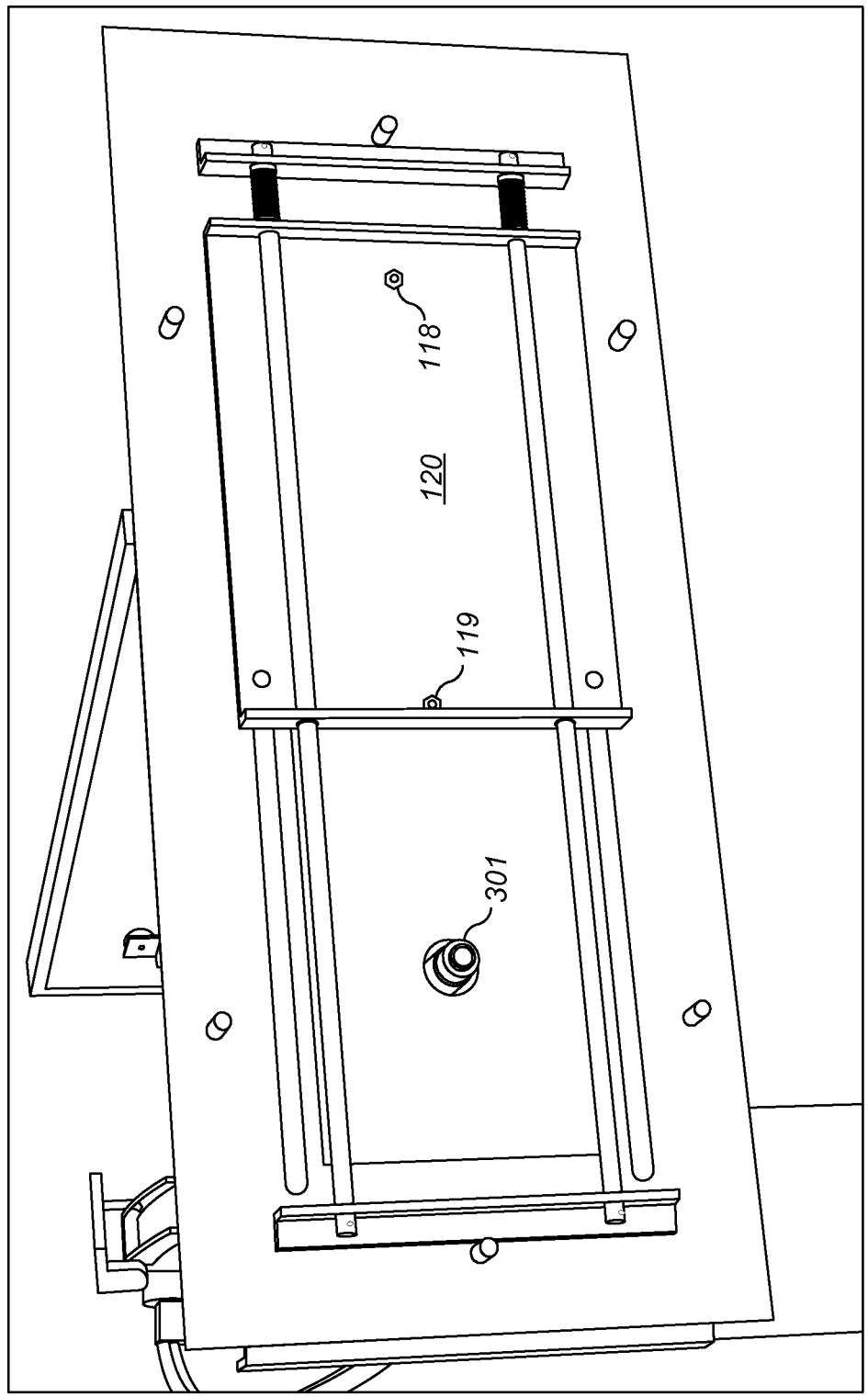

In addition to the thermographic inspection slide 200, a variety of other slides may be used with the device 100. FIGS. 6 to 8 show a variety of views of a slide 201, which may be used in conjunction with a fire extinguisher 300 to tackle a fire within the cabinet 1. FIG. 6 shows a front view of the slide 201 and an extinguisher 300 before connection. FIG. 7 shows the nozzle of the extinguisher connected to the slide 201. FIG. 8 shows a view from the interior of the cabinet with the nozzle of the extinguisher protruding into the cabinet.

If a fire is discovered or suspected inside a cabinet, it can be extremely dangerous to open the door, in case this causes a sudden increase in the intensity of the fire. If an attempt needs to be made to tackle a fire, then slide element 201 can be inserted into frame 120, in the same manner as has already been described. Since the interior of the cabinet is physically shielded from the outside at all times, the risk to the operator is reduced, as compared to opening a door 10 of the cabinet.

The slide 201 comprises a socket 211 to receive the nozzle 301 of a fire extinguisher 300. The fire extinguisher is preferably a carbon dioxide ($CO_2$) fire extinguisher, but any suitable extinguisher may be used. Once the nozzle 301 has been inserted into the socket 211, the trigger on the extinguisher may be actuated, so flooding the interior of the cabinet with carbon dioxide and extinguishing the fire. This can all be achieved without directly exposing any person to the interior of the cabinet. This physical isolation can be further improved by providing the socket 211 with a one-time piercable film, which is penetrated by the nozzle 301, so that the interior of the cabinet is not exposed, even by a small amount, and only the insertion of the nozzle created a physical connection between the interior and the exterior of the cabinet, but that connection is then blocked by the nozzle, ensuring that an operator outside the cabinet is safe.

Figure 9:
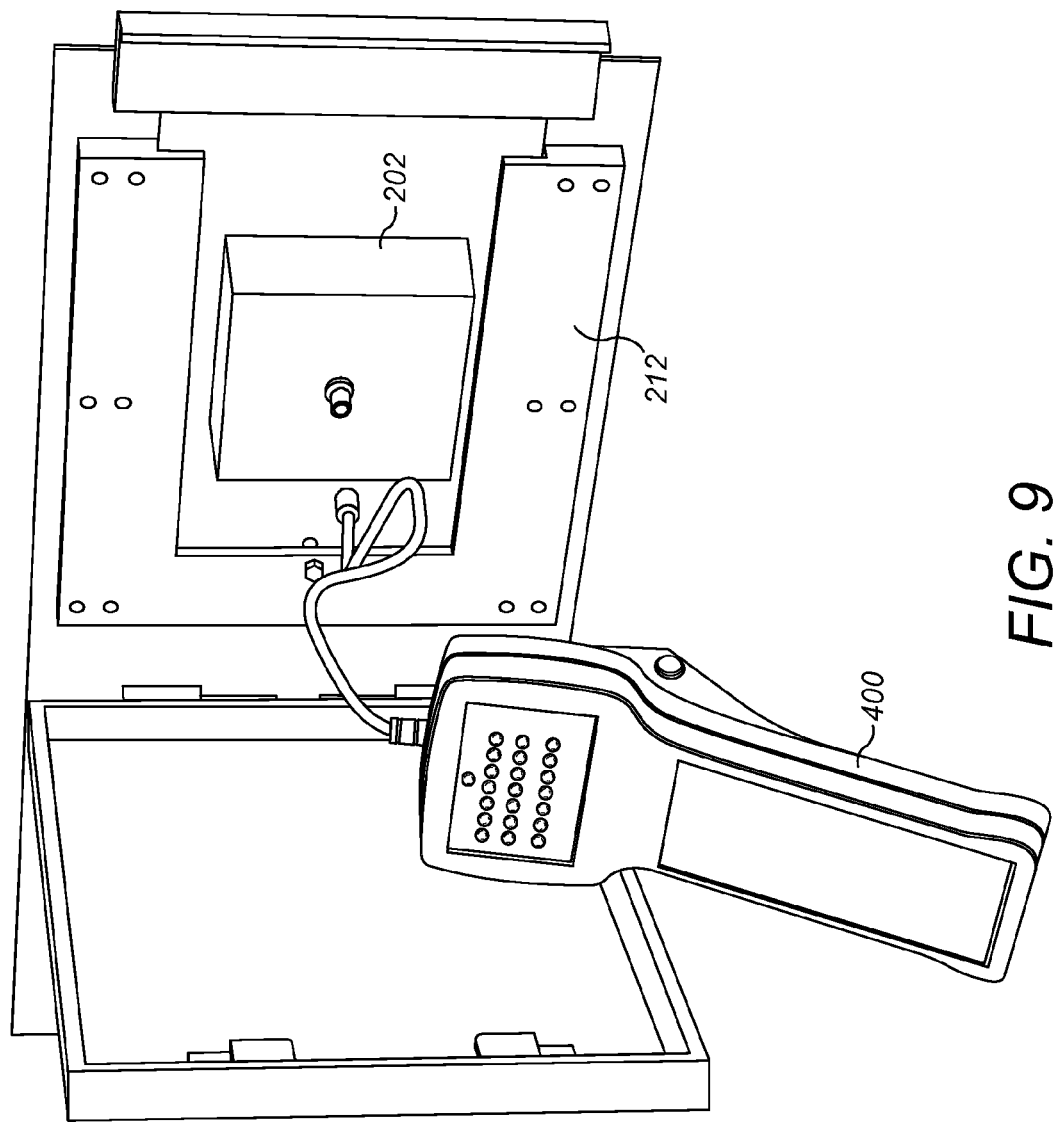
FIG. 9 shows a view of a further variant of the device according to an embodiment of the present invention.

FIG. 9 shows a further slide element 202 for use in partial discharge testing of the electrical equipment inside the cabinet. In medium and high voltage switchgear, discharge and tracking to earth can occur when the insulation between live conductors is compromised e.g.

by dampness or dirt. In extreme cases, the insulation can break down and flashovers or short circuits can occur, which can seriously damage the equipment. Such problems can be detected and diagnosed through use of specialised equipment such as a partial discharge detector 400. In prior art systems, an operator would be required to use such a detector, whilst the interior of the cabinet was exposed, presenting a potential danger to the operator from exposed high voltage systems. The detector 400 comprises a sensitive microphone which is operable to detect the sound of "crackling" which can be indicative of electrical discharge.

By use of slide 202, which includes an adaptor 212, to which is connected the detector 400, an operator is able to perform partial discharge testing safely from the exterior of the cabinet, without exposing himself any potentially dangerous voltages.

Figure 10:
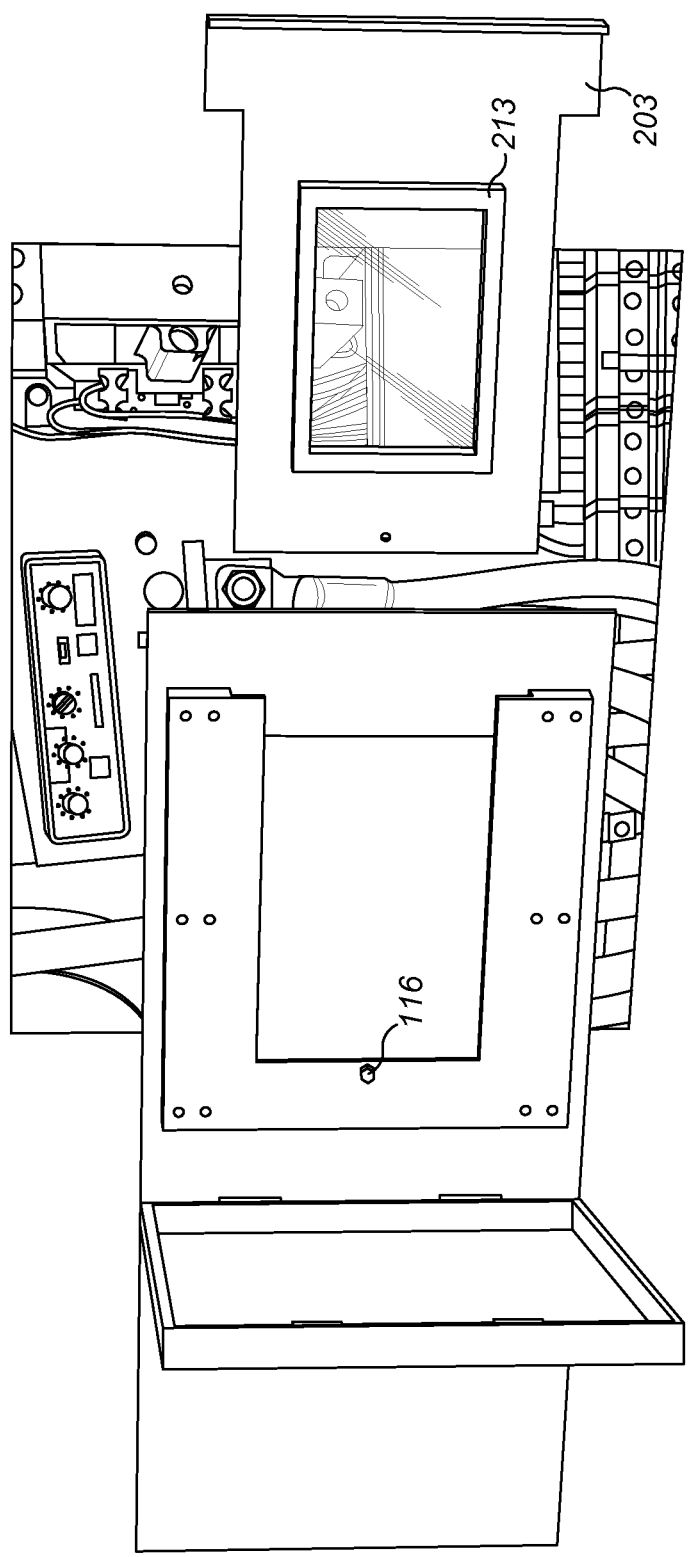
FIG. 10 shows a view of a still further variant of the device according to an embodiment of the present invention.

FIG. 10 shows a still further slide element 203, incorporating a visual inspection window 213. This type of slide may be used when a simple visual inspection of the interior of the cabinet is necessary. The window 213 is formed from a toughened safety glass.

As will be appreciated, the types of slide described herein are exemplary only, and the skilled person will realise that other forms of inspection or functional slide elements can be devised and manufactured to suit particular purposes.

The exemplary embodiments disclosed herein relate to the safer inspection of HV electrical cabinets, but the skilled person will appreciate that other types of equipment may benefit from the improved inspection arrangements made possible by embodiments of the present invention. In particular, rotating machinery, which may be housed in a cabinet, may benefit from the use of an embodiment of the invention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A device for facilitating inspection of an interior of a cabinet, whilst preventing direct physical access thereto, the device comprising:
   a slide element;
   a frame including at least one groove; and
   a movable shutter element adjacent the frame and arranged to move from a closed position to an open position upon insertion of the slide element into the at least one groove, such that insertion of the slide element causes an entirety of the shutter element to move along a plane with the slide element and parallel to the frame so that, in the closed position, the interior of the cabinet is physically shielded from an exterior by the movable shutter element and, in the open position, the interior of the cabinet is physically shielded from the exterior by the slide element.

2. The device according to claim 1 wherein the movable shutter element is biased towards the closed position.

3. The device according to claim 2 wherein a biasing force is provided by a spring.

4. The device according to claim 1 wherein the device is provided with a retaining device retaining the slide element in position once inserted.

5. The device as claimed in claim 4 wherein the retaining device includes a fixing device.

6. The device as claimed in claim 1 wherein the shutter element comprises a projection which protrudes into the at least one groove, such that insertion of the slide element into the at least one groove causes the slide element to contact the projection and so move the shutter element.

7. The device as claimed in claim 1 further comprising a locking device for locking the slide element in position and holding the shutter element in the open position.

8. The device as claimed in claim 1 wherein the slide element is selected from a group consisting of: a thermographic inspection slide element; a fire extinguisher connecting slide element; a visual inspection slide element; and a partial electrical discharge testing slide element.

9. The device according to claim 1 wherein the movable shutter element is concealed behind a lockable closure.

10. The device of claim 1, wherein the movable shutter element is arranged to be substantially planar.

11. The device of claim 10, wherein the movable shutter element is arranged to be substantially planar in both the open position and the closed position.

12. The device of claim 1, wherein the movable shutter element moves in the plane along a pair of elongate rods.

13. The device of claim 12, wherein each of the pair of elongate rods is disposed within a spring that biases the shutter element to the closed position.

14. A cabinet comprising a device for facilitating inspection of an interior of the cabinet, whilst preventing direct physical access thereto, the device comprising:
   a slide element;
   a frame mounted to an exterior surface of the cabinet, the frame including at least one groove between the frame and the cabinet; and
   a movable shutter element adjacent the cabinet and the frame, arranged to move from a closed position to an open position upon insertion of the slide element into the at least one groove, such that insertion of the slide element causes an entirety of the shutter element to move along a plane with the slide element and parallel to the frame so that, in the closed position, the interior of the cabinet is physically shielded from an exterior by the movable shutter element and, in the open position, the interior of the cabinet is physically shielded from the exterior by the slide element.

15. A cabinet as claimed in claim 14 further comprising a door, wherein the device is attached to the door.

16. The cabinet of claim 14, wherein the movable shutter element is arranged to slide from the closed position to the open position along the at least one groove.

17. The cabinet of claim 14, wherein the movable shutter element is arranged to be substantially planar.

18. The cabinet of claim 14, wherein the movable shutter element is arranged to be substantially planar in both the open position and the closed position.

19. The cabinet of claim 14, wherein the movable shutter element moves in the plane along a pair of elongate rods.

20. The cabinet of claim 19, wherein each of the pair of elongate rods is disposed within a spring that biases the shutter element to the closed position.

* * * * *